(12) United States Patent
Zhang

(10) Patent No.: US 9,288,122 B1
(45) Date of Patent: Mar. 15, 2016

(54) PROVIDING RECOMMENDATIONS TO USERS IN A SOCIAL NETWORK

(75) Inventor: Kun Zhang, Mountain View, CA (US)

(73) Assignee: Google Inc., Mountain View, CA (US)

(*) Notice: Subject to any disclaimer, the term of this patent is extended or adjusted under 35 U.S.C. 154(b) by 540 days.

(21) Appl. No.: 13/421,803

(22) Filed: Mar. 15, 2012

(51) Int. Cl.
H04L 12/26 (2006.01)
H04L 29/08 (2006.01)
H04L 12/18 (2006.01)
H04L 12/58 (2006.01)
H04W 4/02 (2009.01)
H04L 29/06 (2006.01)
G06F 15/173 (2006.01)
H04L 29/12 (2006.01)
G06Q 50/00 (2012.01)
G06F 17/30 (2006.01)
H04W 4/08 (2009.01)

(52) U.S. Cl.
CPC .......... *H04L 43/04* (2013.01); *G06F 15/17306* (2013.01); *G06F 17/30867* (2013.01); *G06F 17/30876* (2013.01); *G06Q 50/01* (2013.01); *H04L 12/1827* (2013.01); *H04L 12/581* (2013.01); *H04L 43/045* (2013.01); *H04L 51/04* (2013.01); *H04L 51/08* (2013.01); *H04L 51/10* (2013.01); *H04L 51/14* (2013.01); *H04L 51/20* (2013.01); *H04L 61/609* (2013.01); *H04L 65/403* (2013.01); *H04L 67/06* (2013.01); *H04L 67/1095* (2013.01); *H04L 67/141* (2013.01); *H04L 67/18* (2013.01); *H04L 67/26* (2013.01); *H04L 67/306* (2013.01); *H04W 4/02* (2013.01); *G06F 17/30598* (2013.01); *H04W 4/08* (2013.01); *Y10S 707/99935* (2013.01); *Y10S 707/99954* (2013.01)

(58) Field of Classification Search
CPC ............ G06F 17/30867; H04L 65/403; H04L 67/306; H04L 43/04; H04W 4/08
USPC ........................................................ 709/204
See application file for complete search history.

(56) References Cited

U.S. PATENT DOCUMENTS

| | | | |
|---|---|---|---|
| 8,521,824 B2 * | 8/2013 | Baransky et al. | 709/206 |
| 2009/0319288 A1 * | 12/2009 | Slaney et al. | 705/1 |
| 2010/0191844 A1 * | 7/2010 | He et al. | 709/224 |
| 2011/0083101 A1 * | 4/2011 | Sharon et al. | 715/800 |
| 2012/0041907 A1 * | 2/2012 | Wang et al. | 706/12 |
| 2014/0025765 A1 * | 1/2014 | Mallet et al. | 709/206 |

* cited by examiner

Primary Examiner — Michael C Lai
(74) Attorney, Agent, or Firm — IP Spring

(57) ABSTRACT

Embodiments generally relate to providing recommendations to users in a social network. In one embodiment, a method includes obtaining activity data associated with one or more actions of each user of a plurality of users in a social network, where at least one action of the one or more actions of a performing user is associated with a recommendable user and a target user. The method also includes recommending the recommendable user to the target user based on the at least one action of the performing user.

16 Claims, 6 Drawing Sheets

| Users | Co-Group | Co-Read | Co-Approve | Co-Comment | Co-Share | Co-Conference | Compatibility Value |
|---|---|---|---|---|---|---|---|
| U1,U2 | 2 | 1 | 0 | 0 | 2 | 2 | 7 |
| U1,U3 | 0 | 2 | 2 | 0 | 0 | 2 | 6 |
| U1,U4 | 0 | 0 | 0 | 0 | 0 | 2 | 2 |
| U2,U1 | 2 | 1 | 0 | 0 | 2 | 0 | 5 |
| U2,U3 | 0 | 0 | 0 | 0 | 0 | 0 | 0 |
| U2,U4 | 0 | 0 | 0 | 0 | 0 | 1 | 1 |
| U3,U1 | 0 | 2 | 2 | 0 | 0 | 3 | 7 |
| U3,U2 | 0 | 0 | 0 | 0 | 0 | 0 | 0 |
| U3,U4 | 0 | 3 | 0 | 3 | 0 | 0 | 6 |
| U4,U1 | 0 | 0 | 0 | 0 | 0 | 2 | 2 |
| U4,U2 | 0 | 0 | 0 | 0 | 0 | 1 | 1 |
| U4,U3 | 0 | 3 | 0 | 3 | 0 | 0 | 6 |

FIG. 3

| Group-Level | | Global-Level | | |
| --- | --- | --- | --- | --- |
| Target User | Co-Group | Target User | Recommendable User | Ranking |
| U1 | U2 | U1 | U2 | 1 |
| | | U1 | U3 | 2 |
| | | U1 | U4 | 3 |
| U2 | U1 | U2 | U1 | 1 |
| | | U2 | U4 | 2 |
| | | U3 | U1 | 1 |
| U3 | U4 | U3 | U4 | 2 |
| U4 | U3 | U4 | U3 | 1 |
| | | U4 | U1 | 2 |
| | | U4 | U2 | 3 |

PROVIDING RECOMMENDATIONS TO USERS IN A SOCIAL NETWORK

TECHNICAL FIELD

Embodiments relate generally to social networks, and more particularly to providing recommendations to users in a social network.

BACKGROUND

Social network systems enable users to connect with friends and family, share ideas, and share content such as photos, videos, and music with each other. To help users grow their individual networks, a social network system may provide recommendations to encourage users to add each other as friends. For example, a social network system may provide to a given user a list of recommended people. Such a list for the given user may be a long list of people who are indirectly connected to the user through friends of the user.

SUMMARY

Embodiments generally relate to providing a list of recommended users to a target user in a social network. In one embodiment, a method includes obtaining activity data associated with one or more actions of each user of a plurality of users in a social network. The one or more actions include one or more of adding two or more other users to a group, sharing content with two or more other users, joining a conference with two or more other users, accessing content associated with two or more other users, approving content associated with two or more other users, and commenting on content associated with two or more other users. In various embodiments, a target user is one of the two or more other users associated with the one or more actions. In one embodiment, the obtaining of activity data includes monitoring the one or more actions of each user, and logging each of the one or more actions.

The method also includes computing one or more compatibility values based on the activity data, where each compatibility value indicates a degree of compatibility between the target user and each recommendable user of the plurality of users, where each recommendable user is one of the two or more other users associated with at least one of the one or more actions, and where the computing of the one or more compatibility values includes assigning an action value for each of the one or more actions, incrementing the action value for each occurrence of the one or more actions, and summing the action values. The method also includes generating a ranking of the compatibility values for the target user, and determining a list of recommended users for the target user based on the ranking, where the list includes a predefined number of recommended users associated with high ranking compatibility values.

In one embodiment, a method includes obtaining activity data associated with one or more actions of each user of a plurality of users in a social network, where at least one action of the one or more actions of a performing user is associated with a recommendable user and a target user. The method also includes recommending the recommendable user to the target user based on the at least one action of the performing user.

In one embodiment, the method also includes: computing one or more compatibility values based on the activity data, wherein each compatibility value indicates a degree of compatibility between the target user and each recommendable user of the plurality of users; and generating a ranking of the compatibility values for the target user.

In one embodiment, the one or more actions include adding two or more other users to a group, where the target user is one of the two or more other users associated with the one or more actions, and where each recommendable user is one of the two or more other users associated with at least one of the one or more actions.

In one embodiment, the one or more actions include one or more of sharing content with two or more other users and accessing content associated with two or more other users, where the target user is one of the two or more other users associated with the one or more actions, and where each recommendable user is one of the two or more other users associated with at least one of the one or more actions.

In one embodiment, the one or more actions include joining a conference with two or more other users, where the target user is one of the two or more other users associated with the one or more actions, and where each recommendable user is one of the two or more other users associated with at least one of the one or more actions.

In one embodiment, the one or more actions include approving content associated with two or more other users, where the target user is one of the two or more other users associated with the one or more actions, and where each recommendable user is one of the two or more other users associated with at least one of the one or more actions.

In one embodiment, the one or more actions include commenting on content associated with two or more other users, where the target user is one of the two or more other users associated with the one or more actions, and where each recommendable user is one of the two or more other users associated with at least one of the one or more actions.

In one embodiment, the obtaining of activity data includes: monitoring the one or more actions of each user; and logging each of the one or more actions. In one embodiment, the computing of the one or more compatibility values includes: assigning an action value for each of the one or more actions; incrementing the action value for each occurrence of the one or more actions; and summing the action values.

In one embodiment, the method also includes: computing one or more compatibility values based on the activity data, wherein each compatibility value indicates a degree of compatibility between the target user and each recommendable user of the plurality of users; generating a ranking of the compatibility values for the target user; determining a list of recommended users for the target user based on the ranking; and transmitting the list of recommended users to the target user.

In one embodiment, a system includes one or more processors; and logic encoded in one or more tangible media for execution by the one or more processors. When executed, the logic is operable to perform operations including: obtaining activity data associated with one or more actions of each user of a plurality of users in a social network, where at least one action of the one or more actions of a performing user is associated with a recommendable user and a target user.

In one embodiment, the logic when executed is further operable to perform operations including: computing one or more compatibility values based on the activity data, wherein each compatibility value indicates a degree of compatibility between the target user and each recommendable user of the plurality of users; generating a ranking of the compatibility values for the target user; and determining a list of recommended users for the target user based on the ranking.

In one embodiment, the one or more actions include adding two or more other users to a group, where the target user is one of the two or more other users associated with the one or more actions, and where each recommendable user is one of the two or more other users associated with at least one of the one or more actions.

In one embodiment, the one or more actions include one or more of sharing content with two or more other users and accessing content associated with two or more other users, where the target user is one of the two or more other users associated with the one or more actions, and where each recommendable user is one of the two or more other users associated with at least one of the one or more actions.

In one embodiment, the one or more actions include joining a conference with two or more other users, where the target user is one of the two or more other users associated with the one or more actions, and where each recommendable user is one of the two or more other users associated with at least one of the one or more actions.

In one embodiment, the one or more actions include approving content associated with two or more other users, where the target user is one of the two or more other users associated with the one or more actions, and where each recommendable user is one of the two or more other users associated with at least one of the one or more actions.

In one embodiment, the one or more actions include commenting on content associated with two or more other users, where the target user is one of the two or more other users associated with the one or more actions, and where each recommendable user is one of the two or more other users associated with at least one of the one or more actions.

In one embodiment, to obtain activity data, the logic when executed is further operable to perform operations including: monitoring the one or more actions of each user; and logging each of the one or more actions. In one embodiment, to compute the one or more compatibility values, the logic when executed is further operable to perform operations including: assigning an action value for each of the one or more actions; incrementing the action value for each occurrence of the one or more actions; and summing the action values.

BRIEF DESCRIPTION OF THE DRAWINGS

FIG. 3 illustrates an example table used for computing compatibility values, according to one embodiment.

FIG. 4 illustrates an example table used for ranking compatibility values, according to one embodiment.

DETAILED DESCRIPTION

A method for providing a list of recommended users to a target user in a social network is described. In various embodiments, the list of recommended users is generated based on actions taken by users in the social network. In one embodiment, a system obtains activity data associated with one or more actions of each user in the social network, and recommends users to each other based on such actions. For example, if a performing user A adds other users B and C to a group of user A, user B is a candidate or recommendable user that the system could recommend to target user C, and vice versa. In this example, while user A performs the action, users B and C are the recommendable and target users. In various embodiments described in more detail below, a recommendation may result from combinations of various different actions. Such actions may include, for example, a given user adding two or more other users to a group, accessing content of two or more other users, approving content of two or more other users, commenting on content of two or more other users, sharing content with two or more other users, and joining a conference with two or more other users.

In one embodiment, the system computes compatibility values based on the activity data, where each compatibility value indicates a degree of compatibility between the target user and each recommendable user. In the example actions above, the target user is one of the two or more other users associated with the actions. Each recommendable user is one of the two or more other users associated with at least one of the actions. To compute the compatibility values, the system assigns an action value for each of the actions, increments the action value for each occurrence of an action involving the target user and each recommendable user, and sums the action values associated with each combination of the target user and each recommendable user.

The system then generates a ranking of the compatibility values for the target user. The system then determines a list of recommended users for the target user based on the ranking. In one example implementation, the list includes a predefined number of recommended users associated with high ranking compatibility values. The system then transmits the list of recommended users to the target user.

For clarity, a user that is a candidate user for recommendation to the target user may be referred to as a "recommendable" user. A user that is actually selected for recommendation to the target user may be referred to as a "recommended" user.

Figure 1:
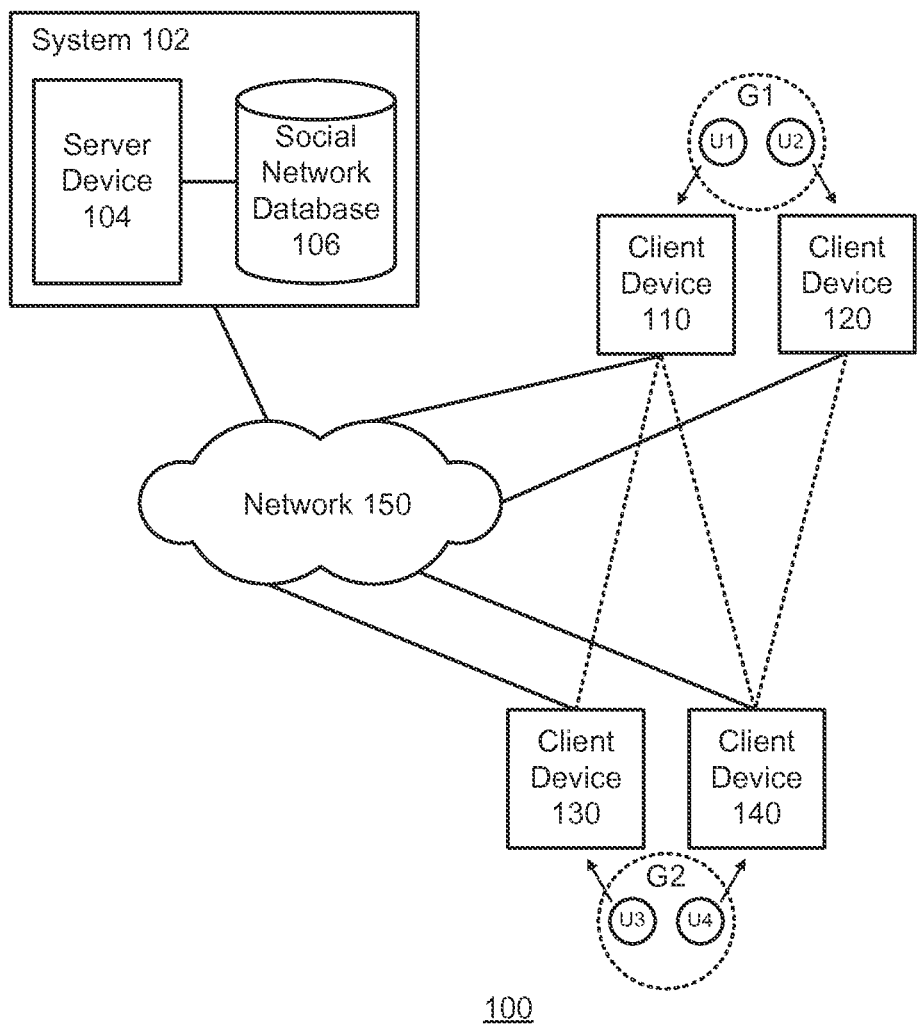
FIG. 1 illustrates a block diagram of an example network environment, which may be used to implement the embodiments described herein.

FIG. 1 illustrates a block diagram of an example network environment 100, which may be used to implement the embodiments described herein. In one embodiment, network environment 100 includes a system 102, which includes a server device 104 and a social network database 106. Network environment 100 also includes client devices 110, 120, 130, and 140, which may communicate with each other via system 102 and a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other embodiments, network environment 100 may not have all of the components shown and/or may have other elements including other types of elements instead of, or in addition to, those shown herein.

In various embodiments, users U1, U2, U3, and U4 may communicate with each other using respective client devices 110, 120, 130, and 140. In various embodiments, users U1, U2, U3, and U4 may belong to social networking groups G1 and G2. For example, users U1 and U2 may belong to group G1, and users U3 and U4 may belong to a group G2.

Figure 2A:
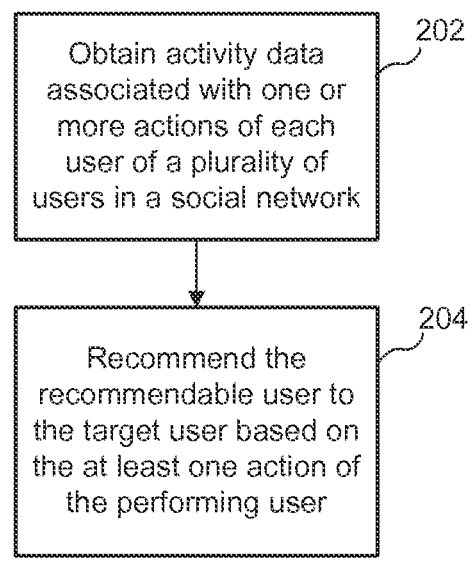
FIG. 2A illustrates an example simplified flow diagram for providing recommendations to users in a social network, according to one embodiment.

FIG. 2A illustrates an example simplified flow diagram for providing recommendations to users in a social network, according to one embodiment. Referring to both FIGS. 1 and 2A, the method is initiated in block 202, where system 102 obtains activity data associated with one or more actions of each user in a social network. In various embodiments, each action of the one or more actions of a performing user is associated with two or more other users in the social network, where the two other users include a recommendable user and a target user, and where at least one action of the one or more actions of a performing user is associated with a recommendable user and a target user.

In various embodiments, for a given action, the user performing the action may be referred to as the performer user. Also, each of the one or more actions of the performing user includes actions associated with the identities of other users, where, for each action, one of the other users may be a recommendable user and another of the other users may be target user, and vice versa. For example, in one embodiment, one of the actions may include a user adding two or more other users to a group. In one embodiment, one of the actions may include a user joining a conference with two or more other users. These and other examples are described in more detail below in connection with FIG. 3. In one embodiment, to obtain activity data, system 102 may monitor one or more actions of each user, and log each of the one or more actions.

As described herein, a target user is a user that receives a recommendation, and a recommendable user is a user that is a candidate user to be recommended to a target user. As indicated above, a target user is one of the two or more other users associated with a given action, and each recommendable user is one of the two or more other users associated with the given action. For example, if a performing user A adds other users B and C to a group (e.g., a group associated with user A), user B could be a candidate or recommendable user, and system 102 could recommend user B to a target user C. Conversely, user C could be a candidate or recommendable user, and system 102 could recommend user C to target user B.

Because system 102 obtains activity data associated with one or more actions of each user in the social network, any given user may be a performing user when that given user performs an action. Furthermore, any given user may be a target user or a recommendable user, depending on the particular action. For example, two users may be recommended to each other, where the system treats each user as both a target user and a recommendable user. Also, in some situations, one or both of these users may be a perform user for the purposes of other recommendations that system 102 may make. Various examples are described in more detail below.

In block 204, system 102 recommends the recommendable user to the target user based on at least one action of the one or more actions performed by the performing user.

Figure 2B:
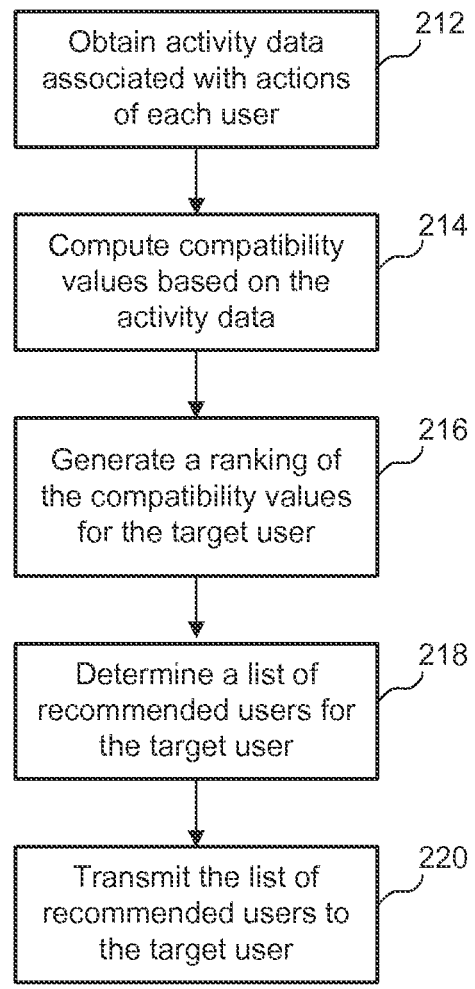
FIG. 2B illustrates an example simplified flow diagram for providing recommendations to users in a social network, according to one embodiment.

FIG. 2B illustrates an example simplified flow diagram for providing recommendations to users in a social network, according to another embodiment. Referring to both FIGS. 1 and 2B, the method is initiated in block 212, where system 102 obtains activity data associated with one or more actions of each user in a social network. In various embodiments, each action of the one or more actions of a performing user is associated with two or more other users in the social network, where the two other users include a recommendable user and a target user.

In block 214, system 102 computes one or more compatibility values based on the activity data. In one embodiment, each compatibility value indicates a degree of compatibility between the target user and each recommendable user. Example embodiments involving compatibility values are described in more detail below in connection with FIG. 3.

In block 216, system 102 generates a ranking of the compatibility values for the target user. In block 218, system 102 determines a list of recommended users for the target user based on the ranking. In block 220, system 102 transmits the list of recommended users to the target user.

Although the steps, operations, or computations may be presented in a specific order, the order may be changed in particular embodiments. Other orderings of the steps are possible, depending on the particular implementation. In some particular embodiments, multiple steps shown as sequential in this specification may be performed at the same time.

FIG. 3 illustrates an example table 300 used for computing compatibility values, according to one embodiment. As shown in FIG. 3, table 300 includes a column 302 of user pairs (e.g., U1, U2). In one embodiment, the user on the left side of a comma is a target user, and the user to the right side of a comma is a candidate or recommendable user. As described in more detail below, the actions described are with respect to actions that a third user has taken with respect to the users of a given user pair. For example, a third user adding both users of a user pair to a group is "co-activity" referred to as a "co-group" action.

Table 300 also includes columns 312, 314, 316, 318, 320, and 322, where each column 312-322 corresponds to a different co-activity. As shown, each entry under each column 312-322 includes a count (also referred to as an action value in various embodiments described herein). In one embodiment, an action value indicates the number of times the co-activity occurred with respect to the corresponding pair of users in column 302. Table 300 also includes a column 330 of compatibility values, where each compatibility value indicates a degree of compatibility between the corresponding pair of users in column 302. The following description provides more details on table 300, according to various embodiments.

As described above in connection with block 212 of FIG. 2B, system 102 obtains activity data associated with one or more actions of each user in a social network, where each of the one or more actions of each user includes actions associated with the identities of particular other users. For example, a particular user is identified as performing particular actions with respect other users, and those other users may be identified as passive recipients of such actions. Examples of such actions are described in detail below, and indications of such actions may be referred to as co-activity signals.

In one embodiment, system 102 may assign an action value (e.g., a count) for each of the one or more actions, increment the action value for each occurrence of the one or more actions, and sum the action values to obtain compatibility values.

In one embodiment, one of the actions may include a user adding two or more other users to a group (also referred to as a "co-group" action, see column 312 of table 300 of FIG. 3). For example, if a given user (e.g., U3) adds two other users (e.g., U1 and U2) to a group of the given user, the added users would both then appear in the same group of another user (e.g., a group of U3). This co-group action would result in one count. If both users (e.g., U1 and U2) appear in the same two groups of other users (e.g., groups of U3 and U4), these co-group actions would result in two counts (e.g., an action value of 2, as shown in column 312 in table 300).

In one embodiment, one of the actions may include a user joining a conference with two or more other users (also referred to as a "co-conference" action, see column 322 of table 300 of FIG. 3). For example, if a user (e.g., user U2) joins a conference with two other users (e.g., U1 and U3), this co-conference action would result in one count. If two users (e.g., U2 and U4) concurrently or separately joined conferences with the two users (e.g., U1 and U3), these co-conference actions would result in two counts (e.g., resulting in an action value of 2, as shown in column 322 in table 300).

In one embodiment, system 102 may give an absolute or integer value (e.g., 1, 2, 3, 4, etc.) for an action value for each co-conference action regardless of any duration associated with each co-conference action. In another embodiment, system 102 may give a weighted value (e.g., 1.4) for an action value if system 102 factors in duration of a given co-activity (e.g., co-conference action).

In one embodiment, one of the actions may include a user accessing content that is associated with two or more other users (also referred to as a "co-read" action, see column 314 of table 300 of FIG. 3). For example, if a given user (e.g., U3) accesses/reads content of two other users (e.g., U1 and U2), this co-read action would result in one count (e.g., resulting in an action value of 1, as shown in column 314 in table 300). If the same user (e.g., U3) or another user (e.g., U4) subsequently accesses content of the same two users (e.g., U1 and U2), the second co-read action would result in a second count.

In one embodiment, system 102 may give an absolute or integer value (e.g., 1, 2, 3, etc.) for an action value for each co-read action. In another embodiment, system 102 may give a weighted value (e.g., 1.6) for an action value if system 102 factors in the duration of the co-activity (e.g., co-read action).

In one embodiment, one of the actions may include a user approving content that is associated with two or more other users (also referred to as a "co-approve" action, see column 316 of table 300 of FIG. 3). For example, if a user (e.g., U2) approves content of two other users (e.g., U1 and U3), this co-approve action would result in one count. If same user (e.g., U2) or another user (e.g., user U4) approves the same or different content of the same two users (e.g., U1 and U3), this co-approve actions would result in a second count (e.g., resulting in an action value of 2, as shown in column 316 in table 300).

In one embodiment, one of the actions may include a user sharing content with two or more other users (also referred to as a "co-share" action, see column 320 of table 300 of FIG. 3). For example, if a user (e.g., user U3) shares content with two other users (e.g., U1 and U2), this co-share actions would result in one count. If the same user (e.g., U3) or another user (e.g., U4) shares content with the same two users (e.g., U1 and U2) a subsequent time, the subsequent co-approve action would result in a second count (e.g., resulting in an action value of 2, as shown in column 320 in table 300).

In one embodiment, one of the actions may include a user commenting on content that is associated with two or more other users (also referred to as a "co-comment" action, see column 318 of table 300 of FIG. 3). For example, if a user (e.g., U1) comments on content with two other users (e.g., U3 and U4), this co-comment action would result in one count. If there are 2 additional co-comment actions, whether by the same user (e.g., U1) or by other users (e.g., U2 and U5), the co-comment actions would result in two more counts (e.g., resulting in an action value of 3, as shown in column 318 in table 300).

In one embodiment, system 102 may give an absolute or integer value (e.g., 1, 2, 3, etc.) for an action value for each co-comment action. In another embodiment, system 102 may give a weighted value (e.g., 1.7) for an action value if system 102 factors in the duration of the co-activity (e.g., co-comment action).

In these examples, such content that is associated with the two or more other users may be content that the two or more other users posted in the social network (e.g., articles, photos, mentions, etc.). While the action values described above included values such as 1, 2, and 3, these are merely examples. Other action values are also possible (e.g., 4, 5, 6, etc.), as well as non-integer values (e.g., 0.4, 0.7, 1.1, 1.8, 2.3, etc.), and results will depend on the specific implementations.

As described above in connection with block 214 of FIG. 2B, system 102 computes one or more compatibility values based on the activity data, where each compatibility value indicates a degree of compatibility between the target user and each recommendable user.

As shown in column 330 of table 300, each compatibility value for each corresponding pair of users may be computed by adding the corresponding action values (e.g., across the corresponding row). For example, as indicated above, the first named user in a pair (e.g., U1 in the pair U1,U2) is the target user and the second named user in a pair (e.g., U2 in the pair U1,U2) is a candidate recommendable user. As such, the compatibility value given for recommending user U2 to U1 is 7. Conversely, referring to the pair U2,U1 in table 300, the compatibility value given for recommending user U1 to U2 is 5.

FIG. 4 illustrates an example table 400 used for ranking compatibility values, according to one embodiment. As shown in FIG. 4, table 400 includes a global-level section 402 and a group-level section 404. The global-level section 402 includes a column 412 that includes target users, a column 414 that includes candidate or recommendable users, and a column 416 that includes rankings. Group-level 404 includes a column 420 that includes target users and a column 422 that includes users in the same circle as the target user.

As described in connection with block 216 of FIG. 2B, system 102 generates a ranking of the compatibility values for the target user. As column 416 of table 400 shows, the recommendable users are ranked for each target user based on the compatibility values. For example, with regard to target user U1, recommendable user U2 has the highest ranking, which correlates with the high compatibility value of 6 (shown in column 330 of FIG. 3). Recommendable user U3 has the next highest ranking, which correlates with the compatibility value of 6. Recommended user U4 has the lowest ranking, which correlates with the low compatibility value of 2.

In one embodiment, system 102 may recognize different levels of co-activity. In the example embodiments described above in connection with FIG. 3, system 102 recognizes all of the co-activities mentioned at a global level, which includes all users in the social network whether or not the users belong to a same group (e.g., as the target user).

In one embodiment, system 102 may recognize all of the co-activities described above at the group level, which includes all users in a given group. In one embodiment, group-level activity would not include co-group activity, because the co-group activity with respect to a given target user would be assumed for that target user at the co-group level. For example, in one embodiment, when computing group-level data, system 102 considers only users in the same group.

In one embodiment, on a global level, system 102 may generate a list of recommended users for a target user based on the following equation:

$$R(Pi) => ((Pj, score\_i\_j), (Pk, score\_i\_k), \ldots ),$$

where $Pi$ is the target user, $Pj$ is a first candidate recommendable user, and $Pk$ is a second candidate recommendable user, $score\_i\_j$ is a compatibility value for user $Pj$, and $score\_i\_k$ is a compatibility value for user $Pk$.

In one embodiment, on a group level, system 102 may generate a list of recommended users for a target user based on the following equation:

$$R(Pi, \text{group\_}m) => ((P\_m\_j, \text{group\_score\_}i\_m\_j), (P\_m\_k, \text{group\_score\_}i\_m\_k), \dots),$$

where Pi is the target user; P_m_j is a first candidate recommendable user in a same group as user Pi; and Pk is a second candidate recommendable user in a same group as user Pi. Group_m is a group that includes users Pi, P_m_j, and P_m_k. Group_score_i_m_j is a compatibility value for user Pj; and score_i_m_k is a compatibility value for user Pk.

In one embodiment, system 102 may aggregate co-activity signals. For example, for a given user, system 102 may aggregate co-activity signals on both a global level and a group level, and may combine a global-level and a group-level co-activity score to generate a list of recommended users to recommend to a given target user.

In one embodiment, system 102 may generate aggregated co-activity data and provide such data to a given target user. In one embodiment, for every group that a given user owns, system 102 recommends to users within each group other users who are similar.

In one embodiment, system 102 may also recommend to a target user users who are similar to people connected to the target user.

In one embodiment, the list of recommended users may include a predefined number of recommended users associated with high ranking compatibility values.

Embodiments described herein provide various benefits. For example, embodiments described herein recommend users to other users based on co-activities associated with the users. This provides meaningful, high-quality recommendations, which would increase overall engagement among users in a social networking environment.

While system 102 is described as performing the steps as described in the embodiments herein, any suitable component or combination of components of system 102 or any suitable processor or processors associated with system 102 may perform the steps described.

Figure 5:
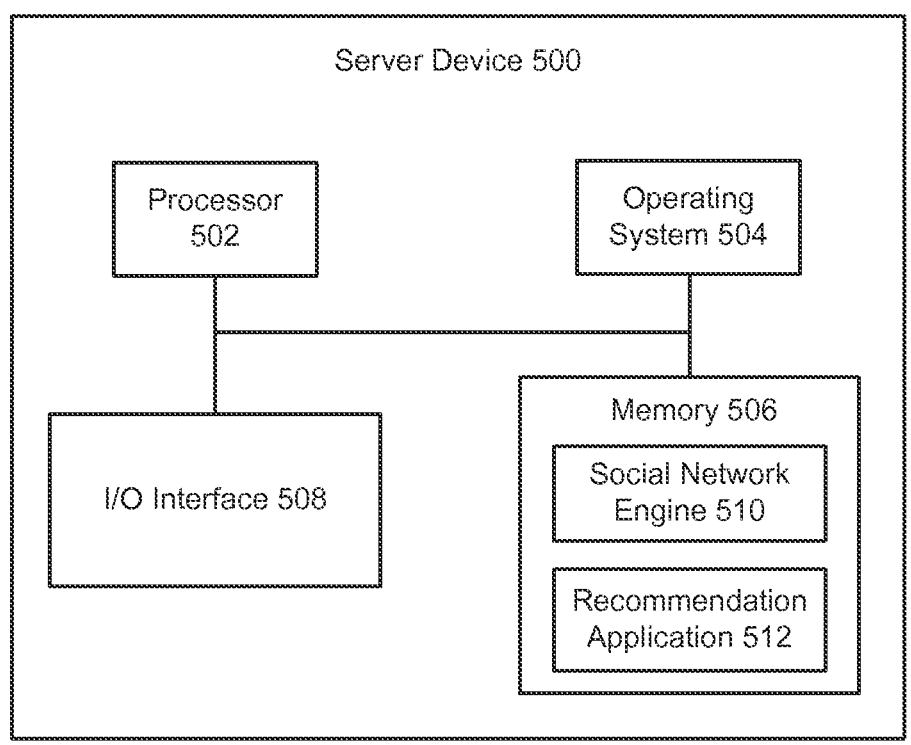
FIG. 5 illustrates a block diagram of an example server device, which may be used to implement the embodiments described herein.

FIG. 5 illustrates a block diagram of an example server device 500, which may be used to implement the embodiments described herein. For example, server device 500 may be used to implement server device 104 of FIG. 1, as well as to perform the method embodiments described herein. In one embodiment, server device 500 includes a processor 502, an operating system 504, a memory 506, and input/output (I/O) interface 508. Server device 500 also includes a social network engine 510 and a recommendation application 512, which may be stored in memory 506 or on any other suitable storage location or computer-readable medium. Recommendation application 512 provides instructions that enable processor 502 to perform the functions described herein and other functions.

For ease of illustration, FIG. 5 shows one block for each of processor 502, operating system 504, memory 506, social network engine 510, recommendation application 512, and I/O interface 508. These blocks 502, 504, 506, 508, 510, and 512 may represent multiple processors, operating systems, memories, I/O interfaces, social network engines, and recommendation applications. In other embodiments, server device 500 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and embodiments.

Note that the functional blocks, methods, devices, and systems described in the present disclosure may be integrated or divided into different combinations of systems, devices, and functional blocks as would be known to those skilled in the art.

Any suitable programming language and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

What is claimed is:

1. A method comprising:

obtaining activity data associated with one or more actions performed by a first user that involve a second user and a third user in a social network, and one or more actions performed by the first user that involve the third user and a fourth user in the social network, wherein the one or more actions performed by the first user that involve the second user and the third user include one or more of the first user viewing content associated with the second user and the third user and the first user commenting on content associated with the second user and the third user;

for the one or more actions performed by the first user that involve the second user and the third user:

assigning an action value to each type of action of the one or more actions, wherein each type of action is a co-activity;

incrementing each of the action values for each additional occurrence of each type of corresponding action; and computing a first compatibility value by summing the action values for each type of action including incremented action values, wherein the first compatibility value indicates a first degree of compatibility between the third user and the second user;

for the one or more actions performed by the first user that involve the third user and the fourth user:

assigning the action value to each type of action of the one or more actions, wherein each type of action is one of the co-activities;

incrementing each of the action values for each additional occurrence of each type of corresponding action; and computing a second compatibility value by summing the action values of each type of action including incremented action values, wherein the second compatibility value indicates a second degree of compatibility between the third user and the fourth user;

generating a ranking of the first compatibility value and the second compatibility value for the third user; and determining a list that includes the second user and the fourth user for the third user based on the ranking.

2. A method comprising:

obtaining activity data associated with one or more actions performed by a first user that involve a second user and a third user in a social network, and one or more actions performed by the first user that involve third user and a fourth user in the social network;

for the one or more actions performed by the first user that involve the second user and the third user:
  assigning an action value to each type of action of the one or more actions, wherein each type of action is a co-activity; and
  computing a first compatibility value by summing the action values for each type of action;

for the one or more actions performed by the first user that involve the third user and the fourth user:
  assigning the action value to each type of action of the one or more actions, wherein each type of action is one of the co-activities; and
  computing a second compatibility value by summing the action values for each type of action;

generating a ranking of the first compatibility value and the second compatibility value for the third user; and recommending the second user or the fourth user to the third user based on the ranking of the first compatibility value and the second compatibility value.

3. The method of claim 2, wherein the first compatibility value indicates a first degree of compatibility between the third user and the second user and the second compatibility value indicates a second degree of compatibility between the third user and the fourth user.

4. The method of claim 2, wherein the one or more actions performed by the first user that involve the second user and the third user comprise the first user approving of content of the second user and content of the third user.

5. The method of claim 2, wherein the one or more actions performed by the first user that involve the second user and the third user comprise the first user joining a conference with the second user and with the third user.

6. The method of claim 2, wherein the actions performed by the first user that involve the second user and the third user comprise the first user sharing content with the second user and the third user.

7. The method of claim 2, wherein the obtaining of activity data comprises:
  monitoring the actions of each user; and
  logging each of the actions.

8. The method of claim 2, wherein for the one or more actions performed by the first user that involve the third user and the second user further comprising:

incrementing each of the action values for each additional occurrence of each type of corresponding action; and wherein computing the first compatibility value by summing the action values of each type of action includes incremented action values.

9. The method of claim 2, wherein the second user and the third user are both members of a group in the social network.

10. A system comprising:

one or more processors; and logic encoded in one or more tangible media for execution by the one or more processors and when executed performs operations comprising:
  obtaining activity data associated with one or more actions performed by a first user that involve a second user and a third user in a social network, and one or more actions performed by the first user that involve the third user and a fourth user in the social network;
  for the one or more actions performed by the first user that involve the second user and the third user:
    assigning an action value to each type of action of the one or more actions, wherein each type of action is a co-activity; and
    computing a first compatibility value by summing the action values for each type of action;
  for the one or more actions performed by the first user that involve the third user and the fourth user:
    assigning the action value to each type of action of the one or more actions, wherein each type of action is one of the co-activities; and
    computing a second compatibility value by summing the action values for each type of action;
  generating a ranking of the first compatibility value and the second compatibility value for the third user; and
  recommending the second user or the fourth user to the third user based on the ranking of the first compatibility value and the second compatibility value.

11. The system of claim 10, wherein the first compatibility value indicates a first degree of compatibility between the third user and the second user and the second compatibility value indicates a second degree of compatibility between the third user and the fourth user.

12. The system of claim 10, wherein the one or more actions performed by the first user that involve the second user and the third user comprise the first user approving content of the second user and content of the third user.

13. The system of claim 10, wherein the one or more actions performed by the first user that involve the second user and the third user comprise the first user joining a conference with the second user and with the third user.

14. The system of claim 10, wherein the one or more actions performed by the first user that involve the second user and the third user comprise the first user sharing content with the second user and the third user.

15. The system of claim 10, wherein when obtaining the activity data, the logic when executed further performs operations comprising:
  monitoring the actions of each user; and
  logging each of the actions.

16. The system of claim 10, wherein the second user and the third user are both members of a group in the social network.

* * * * *